Nov. 4, 1947.  J. J. PARKES ET AL  2,430,363
CONTROL ARRANGEMENT FOR AIRCRAFT POWER UNITS
Filed Dec. 29, 1944  3 Sheets-Sheet 1
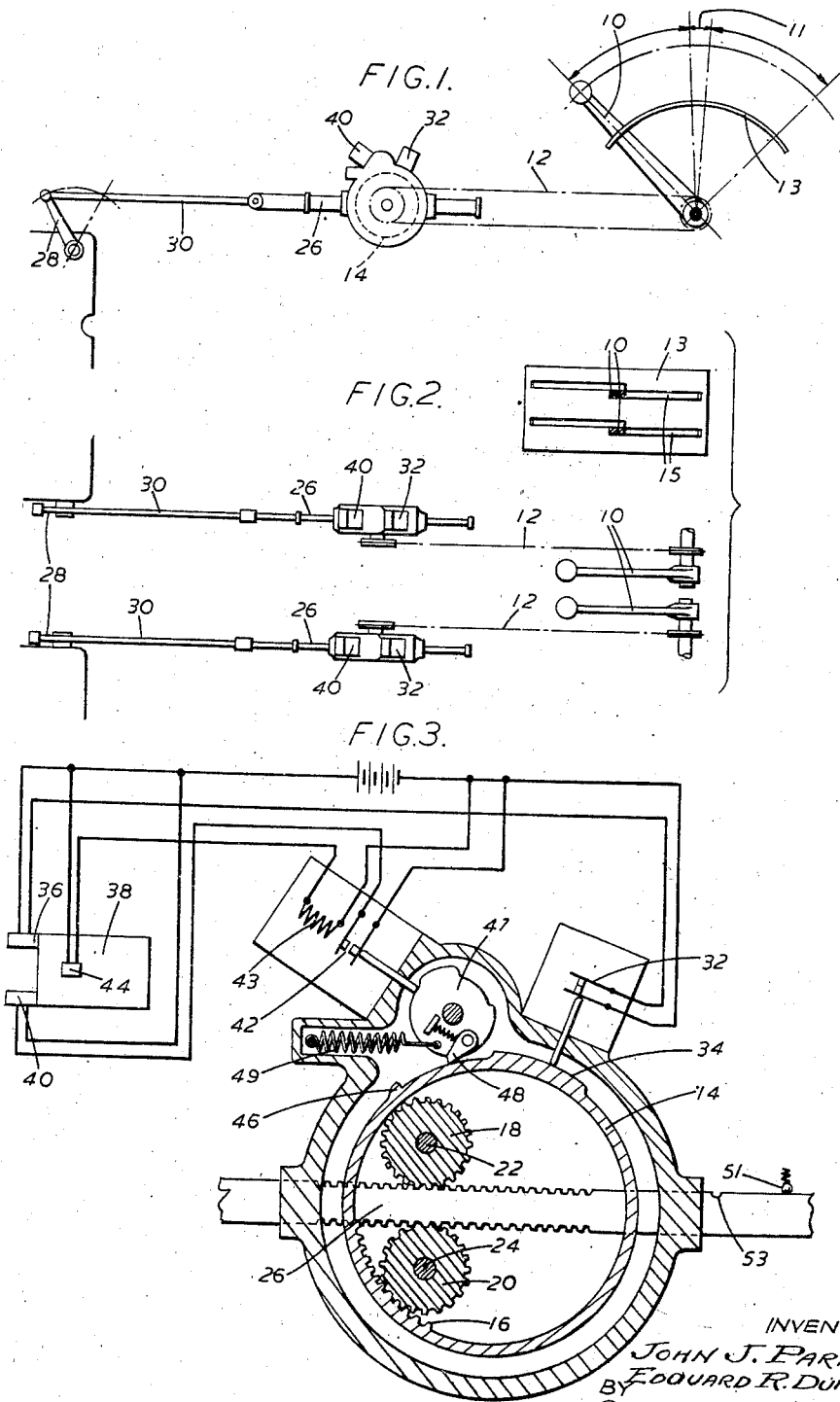

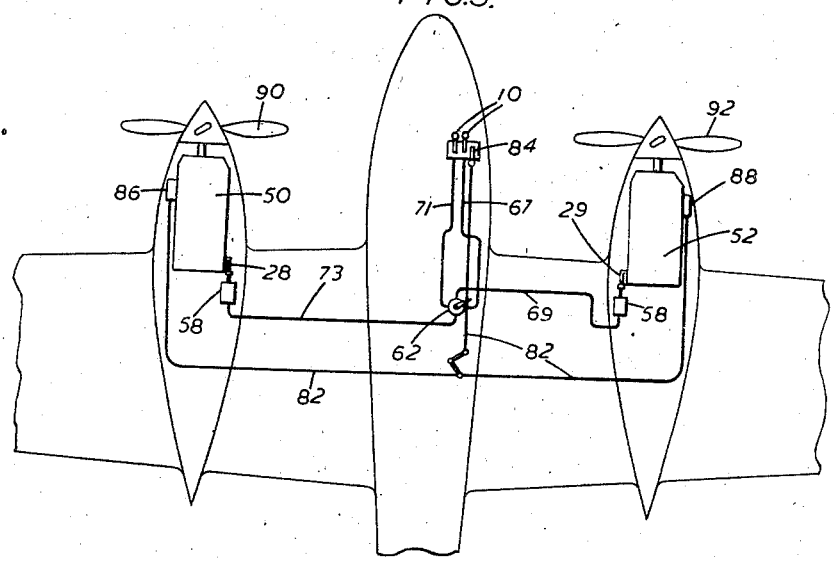
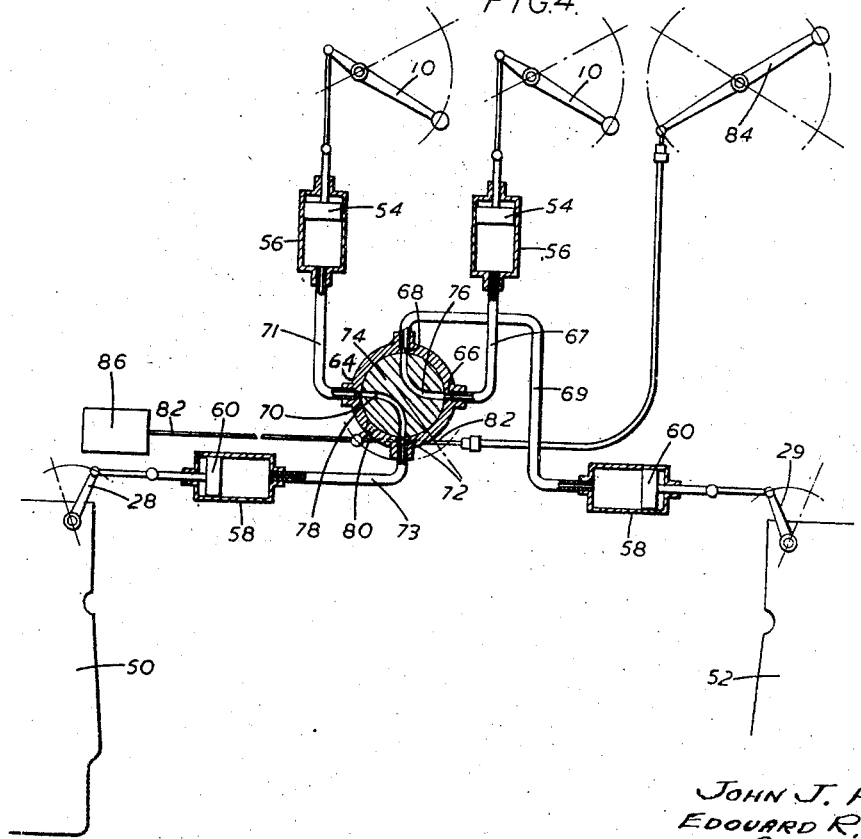

Nov. 4, 1947.  J. J. PARKES ET AL  2,430,363
CONTROL ARRANGEMENT FOR AIRCRAFT POWER UNITS
Filed Dec. 29, 1944   3 Sheets-Sheet 3
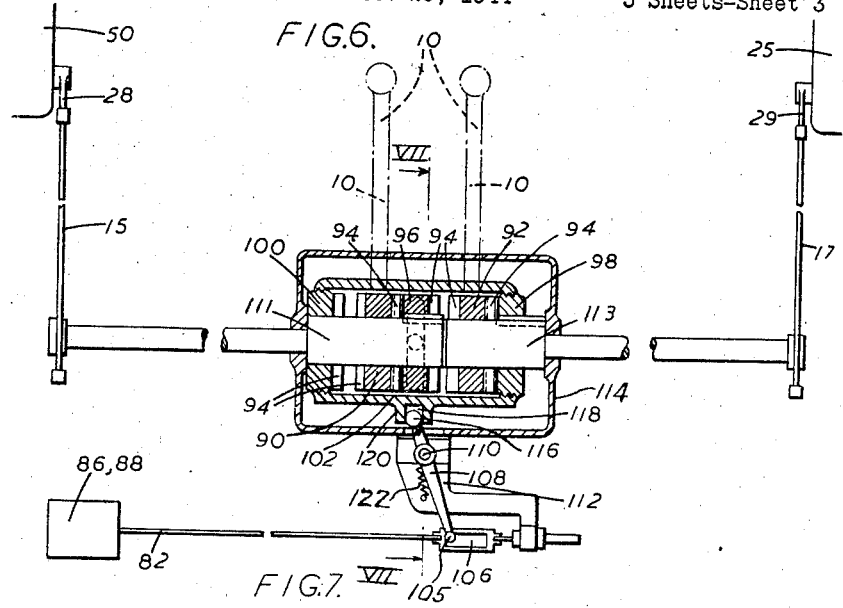
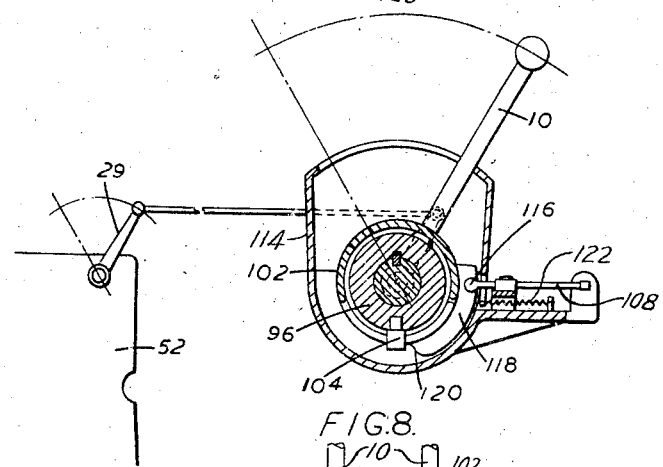
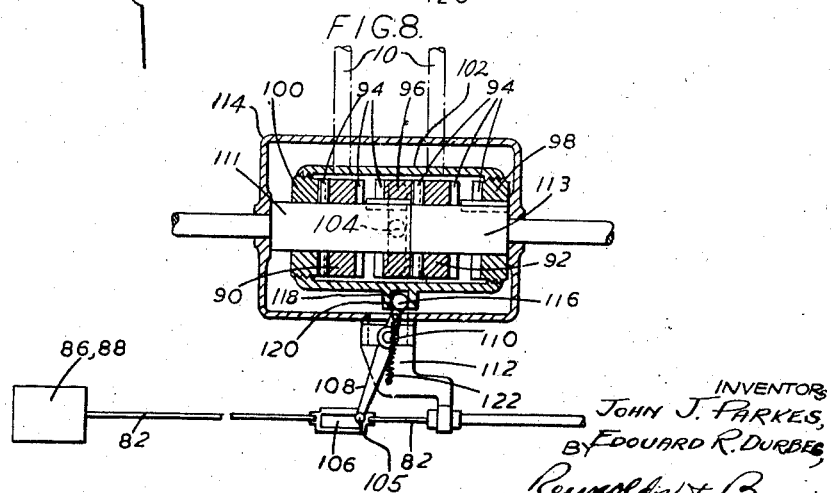
INVENTORS
JOHN J. PARKES,
BY EDOUARD R. DURBEC
Reynolds & Beach
their ATTORNEYS Patented Nov. 4, 1947

2,430,363

UNITED STATES PATENT OFFICE 2,430,363

CONTROL ARRANGEMENT FOR AIRCRAFT POWER UNITS

John Joseph Parkes and Edouard Raoul Durbec, Hatfield, England, assignors to The De Havilland Aircraft Company Limited, Hatfield, Hertfordshire, England Application December 29, 1944, Serial No. 570,430
In Great Britain July 21, 1943

9 Claims. (Cl. 244—51)

When a twin-engine or multi-engine aircraft is being landed, any tendency of the aircraft to swing when on the ground is usually corrected by means of the engines, the pilot opening the throttle of an engine on the side of the aircraft towards which it is swinging, or closing the throttle of an engine on the other side.

The airscrews of such aircraft are often provided with pitch-change mechanism enabling the blades to be turned to negative pitch for use as landing brakes, and when an aircraft is being landed with the airscrews in negative or braking pitch and therefore exerting thrust backwardly, the correction of swing by means of the engines requires a reverse operation of the throttles, that is to say the pilot must either close the throttle of an engine on the side of the aircraft towards which it is swinging, or else open the throttle of an engine on the other side.

A pilot who has been trained on an aircraft the airscrews of which are not reversible in pitch becomes so accustomed to the correction of swinging by manipulation of the throttle levers that his actions become automatic or instinctive, and there is therefore a risk that when such a pilot lands an aircraft with airscrews in negative pitch he will operate the throttle levers in the accustomed manner, without regard to the necessity for reversing the operation in view of the reversal of airscrew thrust. The result is to accentuate the swing instead of correcting it and the consequences would generally be serious.

According to the present invention this risk is avoided by providing an operative connection between the pitch-change control mechanism and the throttle connections such that when the pitch of the airscrews is negative the throttle connections are changed to cause the throttles to be actuated in a manner which is the reverse of that intended by the pilot. Thus, for example, the change may be such that when the pilot moves a throttle lever with the intention of opening the throttle of one of the engines, that throttle is closed instead; or the change may be such that movement of a throttle lever with the intention of opening (or closing) the throttle of an engine on one side of the aircraft, causes the throttle of an engine on the other side to be opened (or closed) instead.

In one form of the invention the change from positive to negative pitch for braking during landing is initiated by movement of the throttle levers themselves to a position outside the normal range of movement for throttle control and the connection between each throttle lever and the corresponding engine throttle includes a reversing device actuated by the throttle lever when moved to its abnormal or landing-brake position, this reversing device then having the effect that if the throttle lever is moved in a direction which would normally open (or close) the throttle, this throttle is in fact closed (or opened) instead. This form is illustrated in Figures 1, 2, and 3.

In another form of the invention the change from positive to negative pitch is effected by a control member other than the throttle levers and the actuation of this control member transposes the connections between the throttle levers and the throttles so that a lever which normally controls the throttle of an engine on one side of the aircraft now controls instead the throttle of the corresponding engine on the other side of the aircraft. This form is illustrated in Figures 4 and 5, and, in a modified arrangement, also in Figures 6, 7, and 8.

Referring to the accompanying drawings:

Figure 1 is a diagrammatic view in side elevation of an illustrative control means according to this invention;

Figure 2 is a similar view in plan;

Figure 3 is a side elevation in section on an enlarged scale of a part of the control means shown in Figures 1 and 2;

Figure 4 is a diagrammatic view of an alternative control means, hydraulically operated;

Figure 5 is a diagram showing the control means of Figure 4 installed in a twin-engine aircraft;

Figure 6 is a diagrammatic sectional view in plan of a control means generally similar to that of Figures 4 and 5, but mechanically operated;

Figure 7 is a side elevation in section on the line VII—VII in Figure 6; and

Figure 8 is a view similar to Figure 6 showing the parts in a different position.

Referring to Figures 1 to 3, each throttle lever 10 is connected by an endless chain or cable 12 to a rotatably mounted drum 14 (Figure 3) carrying an internal toothed gear segment 16 of limited angular extent. This gear segment co-operates with two pinions 18, 20 rotating about separate axes 22, 24 respectively spaced apart, these two pinions meshing with opposite sides of a double rack 26. The angular extent of the gear segment 16 is such that it cannot be in mesh with both pinions at the same time, but comes into mesh with one of them shortly after going out of mesh with the other.

The throttle lever 10 is mounted in the usual manner so that it is upright when the throttle is closed and is moved forwards (to the right in the drawing) to open the throttle. This is the normal range of movement of the lever during take-off and flight when the airscrews are in positive pitch, and throughout this normal range of movement the toothed segment 16 remains in mesh with the pinion 18 only. The rack 26 is connected to the engine throttle arm 28 by means such as a control rod 30. Movement of the throttle lever 10 rightward from closed towards open position (Figure 1) normally merely moves the throttle arm 28 leftward, to increase the fuel supply to the engine.

When the throttle lever is moved backwards (to the left) from the upright or closed position, to the position shown in Figures 1 and 2, outside its normal operational range, the drum 14 is rotated into a position similar to that shown in Figure 3 and the gear segment 16 moves out of mesh with the pinion 18 and then moves into mesh with the pinion 20. This abnormal movement of the drum brings about the change from positive to negative pitch of the airscrew in a manner to be explained hereinafter.

As soon as the gear segment 16 is in mesh with the pinion 20 the rearward (or leftward) movement of the throttle lever will move the rack 26 in the same direction as formerly when the lever was moved forwardly within its normal range. In other words, the throttle will be opened progressively as the lever is moved backwards from the upright position. The connection between the lever and the throttle has been reversed. Whenever the pilot moves the throttle lever 10 in the sense which normally would increase the fuel supply to the engine, actually the fuel supply will be decreased instead, and vice versa.

If now the aircraft swings after touching down, the automatic reactions of the pilot will cause him, say, to move one of the throttle levers 10 forward with the intention of opening the corresponding throttle to increase the forward thrust of that engine. Instead, the throttle will be closed thereby decreasing the backward thrust of the engine. This will have the effect of correcting the swing, just as the intended action of the pilot would have corrected it if the pitch of the airscrews had not been reversed.

It is to be noted that the control of speed also is effected correctly by moving the throttle levers in the customary manner. If for example the pilot of an aircraft with non-reversible airscrews wishes to decrease speed on the ground he moves the throttle levers backwards to close the throttles and decrease forward thrust. In an aircraft having the mechanism according to this invention, rearward movement of the levers will open the throttles further to increase backward thrust, thus causing the aircraft to decelerate more rapidly.

If the pilot has to make an emergency take-off after having landed he will push the throttle levers right forward, thereby causing the airscrews to revert to positive pitch (as will presently be explained) and opening the throttles fully after a momentary closing.

The initiation of pitch reversal for braking and unbraking is preferably effected electrically. A normally open switch 32 is closed by a cam projection 34 on the drum 14 which projection extends throughout the full range of abnormal or backward movement of the throttle lever 10. Closure of this switch energises a solenoid 36 which causes the blades to be moved to negative pitch, for example by operating a valve associated with hydraulic pitch-change control mechanism indicated at 38.

The return to positive pitch is effected by energising another solenoid 40 the circuit of which includes a switch 42 having a holding solenoid 43 energised by the closing of a pressure-operated switch 44. A tooth 46 on the drum 14 rotates a cam 47 to close the switch 42 during the return or clockwise movement of the drum immediately after the cam projection 34 has released the first switch 32 to allow it to open by spring action. The tooth 46 operates the switch 42 through a lightly spring-pressed pawl 48 carried by the cam 47 so that the tooth can lift and pass the pawl during the counter-clockwise movement of the drum 14 to its abnormal or braking position. This second switch 42 is opened at the proper time by the opening of the switch 44 in the holding solenoid circuit, a spring 49 then returning the parts to their original positions.

The length of the toothed segment or mutilated gear 16 is such that the drum 14 rotates through an appreciable angle, after the segment has come out of mesh with the pinion 18 or 20, before coming into mesh with the pinion 20 or 18. This lost motion, represented by the angle 11 in Figure 1, ensures that the engine throttle shall not be re-opened, when changing from negative to positive pitch, before the switch 42 has been closed to move the airscrews into positive pitch.

When the gear segment 16 is not in mesh with either of the pinions 18, 20, the rack 26 is not under the control of the throttle lever 10. In order to hold the rack yieldingly in these circumstances, a spring-pressed detent 51 is provided which engages in a notch 53 in the rack 26.

It is also desirable to provide means for yieldingly holding the throttle levers 10 in the throttle-closed position. This may be effected by providing a "gate" device such as is shown in Figures 1 and 2, consisting of an arcuate plate 13 having cranked slots 15 for the levers. The flexibility of the levers enables them to be moved sideways through the cranked portions of these slots when desired, but these portions prevent undesired or accidental movement of the levers past the throttle-closed position.

Whereas in the form shown in Figures 1, 2, and 3 the connection between each individual throttle lever and its throttle arm is reversed by the action which effects reversal of the airscrew pitch, in the embodiment of the invention shown in Figures 4 and 5, means are provided for transposing the hydraulic connections between the two throttle levers 10 and the throttle arms 28, 29 of the two engines 50, 52. Each throttle lever is connected to a piston 54 sliding in a hydraulic cylinder 56. The two cylinders 56 would normally be connected separately and individually by pipes 67, 69 and 71, 73, respectively, to two cylinders 58 in which slide pistons 60 connected to the throttle arms 28, 29. As shown clearly in Figure 4, a transposing valve 62 is interposed in the pipe connections. The casing 64 of this valve has four ports 66, 68, 70 and 72, arranged at angular intervals of 90 degrees. The port 66 is connected by the pipe 67 to the starboard cylinder 56, the port 68 is connected by the pipe 69 to the starboard cylinder 58, the port 70 is connected by the pipe 71 to the port cylinder 56 and the port 72 is connected by the pipe 73 to the port cylinder 58.

The plug or movable portion 74 of the valve has two passages 76, 78. In the normal position indicated in full lines in Figure 4, the passage 76 connects the ports 66 and 68 together and the passage 78 connects the ports 70 and 72 together. Hence the port throttle lever 10 will control the throttle of the port engine and the starboard throttle lever will control the throttle of the starboard engine. If, however, the plug 74 is rotated 90 degrees counterclockwise, as will shortly appear is the case upon pitch reversal of the airscrew blades, the passage 76 will connect together the ports 68 and 70 and the passage 78 will connect together the ports 66 and 72. With the valve in this position, therefore, the port throttle lever will control the throttle of the starboard engine and the starboard throttle lever will control the throttle of the port engine. The throttle-control connections have been transposed.

An arm 80 secured to the valve plug 74 is connected to a flexible control cable 82 connecting a pitch-changing hand lever 84 to the pitch-change control mechanism 86, 88 of the two airscrews 90, 92. Only one of these mechanisms 86 is shown in Figure 4; in Figure 5 they are shown mounted on engines 50, 52 respectively. The arrangement of the parts 80, 82, 84, 86, 88 is such that when they are in the positions shown in full lines the airscrews are in positive pitch and, as already explained, the throttle control connections are normal—that is, they are not transposed. When the lever 84 is moved to its dotted-line position to cause the mechanisms 86, 88 to reverse the pitch of the airscrews, the valve plug 74 is thereby moved to its dotted-line position to transpose the throttle control connections. Hence, whenever the airscrews are in negative pitch and are acting as landing brakes, the pilot, in attempting for example to open the throttle of the port engine to correct a swing to port, will instead open the throttle of the starboard engine; or, if he attempts to operate the throttle of the starboard engine he will instead operate the throttle of the port engine.

In another embodiment of the invention shown in Figures 6, 7 and 8 means are provided for transposing the connections between two throttle levers 10 and the throttles of two engines one on either side of the aircraft, just as such connections were transposed in the form of Figures 4 and 5, but in the form of Figures 6, 7, and 8 these connections are mechanical rather than hydraulic, as in Figures 4 and 5. In this embodiment each throttle lever is mounted on a separate shaft 111, 113, the two shafts being co-axial and normally free of one another. The shaft 111 is connected suitably (for example by a link 15) to the throttle arm 28 of the port engine and the shaft 113 is connected by a link 17 to the throttle arm 29 of the starboard engine. Each lever 10 is free to rotate on its shaft but held against endwise movement (for example by a pin sliding in a circumferential slot in the shaft, or equivalent means) and the hubs 90, 92 of both of them are formed with radial serrations 94 of fine pitch on both faces, these serrations constituting clutch teeth. An axially movable clutch member 96 is splined to a part of the port shaft 111 which projects beyond its throttle lever towards the extremity of the starboard shaft 113. This clutch member 96 has clutch teeth 94 on both faces. When moved to the left it clutches the port throttle lever 10 to the port shaft 111; when moved to the right it clutches the starboard lever 10 to the port shaft 113.

A second axially movable clutch member 98 is splined to the starboard shaft 113 on the starboard or righthand side of the starboard throttle lever. It is formed with clutch teeth 94 on one face to co-operate with those on the right-hand face of the starboard lever hub 92 and it is connected to the first clutch member 96 so that it moves axially in company with it but can rotate relatively to it as will be explained.

A third clutch member 100 is mounted on the port shaft 111. It is free to slide on and rotate relative to that shaft, it has clutch teeth 94 co-operating with the left-hand face of the port lever hub 90 and it is rigidly connected to the second clutch member 98. The connection consists of a sleeve 102 to which the two members 98, 100 are fixed and which encloses the hubs 90, 92 of the two levers 10 and the first clutch member 96 situated between them. This sleeve is slotted to accommodate the levers themselves and it has a circumferential pin-and-slot connection 104 with the first clutch member 96.

It will be seen that all three clutch members 96, 98, 100 move in company in the axial or endwise direction, that the second (98) and third (100) rotate in company and that the first (96) can rotate independently of the other two.

When the assembly thus constituted is moved to the left, as shown in Figure 6, the port lever 10 is clutched to the port shaft 111 by the member 96 and the starboard lever 10 is clutched to the starboard shaft 113 by the member 98. This is the normal position which it occupies when the airscrews are in positive pitch. When the airscrews are in negative pitch the assembly is moved to the right, as shown in Figure 8, the port lever 10 is clutched to the starboard shaft 113 by means of member 100, sleeve 102 and member 98, and the starboard lever 10 is clutched to the port shaft 111 by means of the member 96, thus transposing the connections between the two levers 10 and the two engine throttles. Consequently the pilot, obeying his automatic reactions and operating the port lever 10 with the intention of opening (or closing) the throttle of the port engine, will instead open (or close) the throttle of the starboard engine, and similarly for the starboard lever.

For convenience, the first clutch member 96 has been described as being splined to the port shaft 111, but it is evident that it might be splined to the starboard shaft 113 instead, the third clutch member 100 being splined to the port shaft 111 and the second clutch member 98 being mounted on the starboard shaft 113.

The control lever by means of which the pilot reverses the pitch of the airscrews (for example as described with reference to Figures 4 and 5) is connected to the movable clutch assembly 96, 98, 100, 102, so that this assembly is moved from one position to the other during the latter part of the pitch-change operation, lost motion being provided to ensure this. The flexible control member 82 leading from the control lever (such as the lever 84 shown in Figures 4 and 5) to the pitch-change control mechanism 86, 88, has interposed in it a slotted plate 106 in which engages a pin 105 on one end of a lever 108 pivoted at 110 to a bracket 112 secured to the casing 114 in which the shafts 111, 113 and the parts associated therewith are enclosed. Thus the lever 108 is operated only during the latter part of the movement of the pitch-change control mechanism in either direction, whether the pitch is changing from positive to negative or from nega- tive to positive.

The other end of the lever 108 has a knob 116 sliding in a circumferential groove 118 formed in a rib 120 projecting from the side of the sleeve 102. Thus the sleeve can be moved endwise by means of the lever 108 whatever angular position it may occupy.

A coil tension spring 122 is attached at one end to the inner end of the lever 108 and at the other end to the bracket 112. As the lever 108 swings from the position shown in Figure 6 to that shown in Figure 8 the centre line of the spring passes across the axis of the pivot 110. It therefore acts as a spring toggle device, tending to maintain the sleeve 102 in either of its extreme positions.

What we claim is:

1. In an aircraft having at least one engine offset on each side from the centre-line and having means for reversing the pitch of the airscrews, throttles for such engines, throttle control connections for such engines, airscrew pitch-reversing means for both airscrews, and control means including an operative connection between said airscrew pitch-reversing means and said throttle control connections operable, when the pitch of the airscrews is rendered negative by said pitch-reversing means, to change said throttle control connections to cause said throttles to effect a result, when actuated, which is the reverse of the result effected by their operation when the pitch of the airscrews is positive.

2. In an aircraft having a port engine and a starboard engine on opposite sides of the centre-line of the aircraft, respectively, each engine being equipped with a reversible pitch propeller, control means comprising propeller pitch-reversing means operatively connected to the propellers of both engines, a port throttle actuator, a starboard throttle actuator, throttle-connecting means normally connecting said port throttle actuator to the port engine for regulating the same and said starboard throttle actuator to the starboard engine for regulating the same, and reversing means for said throttle-connecting means, controlled by said propeller pitch-reversing means and operable to alter said throttle-connecting means to connect said port throttle actuator to the starboard engine and said starboard throttle actuator to the port engine.

3. The combination defined in claim 2, wherein the throttle-connecting means are hydraulic and include a four-way transposing valve actuated by the propeller pitch-reversing means.

4. The combination defined in claim 2, wherein the throttle-connecting means are mechanical and include a multiple-clutch device actuated by the propeller pitch reversing means.

5. The combination defined in claim 1, wherein the operative connection between the airscrew pitch-reversing means and the throttle control connections includes a mutilated gear operatively connected in the throttle control connection, and also operatively connected to pitch-reversing means for shifting by and with the latter between positive and negative positions, two pinions disposed to mesh selectively, but not simultaneously, with the teeth of said mutilated gear, depending upon whether said pitch-reversing means and the mutilated gear are in negative or positive position, and throttle-operating means common to and operatively connected to both said pinions, for mutually reverse operation by the respective pinions.

6. The combination defined in claim 5, wherein the throttle-operating means common to the two pinions comprises a rack with which both said pinions are operatively but reversely connected, said rack being operatively connected to a throttle.

7. In an aircraft having a port engine and a starboard engine, and having means for reversing the pitch of the airscrews driven by the respective engines, engine control mechanism including throttle actuators for each such engine, an operative connection between each throttle actuator and its engine, including an element common to both such operative connections, and shiftable between two positions, in one whereof operation of the port and starboard throttle actuators effects operation of the corresponding engines, and in the other whereof operation of the port throttle actuator effects operation of the starboard engine, and operation of the starboard actuator effects operation of the port engine, and means operatively connected to the pitch-reversing means, and to said common element, for shifting the latter in conjunction with operation of the pitch-reversing means to maintain connection between the port and the starboard throttle actuators and the corresponding engines when the pitch-reversing means is in positive-pitch position, and to effect reversal of such connections between the two actuators and the two engines when the pitch-reversing means is in negative-pitch position.

8. In an aircraft having a port engine and a starboard engine, each engine being equipped with a reversible-pitch airscrew, pitch-reversing means individual to each such airscrew, control mechanism including an actuator individual to each engine and to its airscrew's pitch-reversing means, each such actuator being movable through a normal range and an abnormal range, an operative connection between each actuator and, respectively, its engine and pitch-reversing means, said connection being organized and arranged to effect decrease of the engine's fuel supply upon movement of the actuator in a given sense while in normal range, but to effect increase in the engine's fuel supply upon movement of the actuator in the same sense while in abnormal range, and including means to effect actuation of said pitch-reversing means to reverse the airscrew's pitch from positive to negative pitch upon movement of the actuator from normal to abnormal range, and conversely to effect actuation of the pitch-reversing means to reverse the airscrew's pitch from negative to positive pitch upon movement of the actuator from abnormal to normal range.

9. In an aircraft having a port engine and a starboard engine, each engine being equipped with a reversible-pitch airscrew, pitch-reversing means individual to each airscrew, a throttle lever individual to each engine, and movable through a normal range and an abnormal range, a throttle arm individual to each engine, movable in one sense to increase fuel supply to its engine, and in the opposite sense to decrease that fuel supply, an operative connection between each throttle arm and its throttle lever, whereby movement of the throttle lever in a given sense, in normal range, will move the throttle arm in the opening sense, and vice versa, means included in said operative connection for reversing the same upon movement of the throttle lever from normal to abnormal range, or for returning the same to its initial arrangement upon movement of the throttle lever from abnormal back to normal range, whereby movement of the throttle lever in the same given sense, in abnormal range, will move the throttle arm in the closing sense, and vice versa, and an operative connection between each throttle lever and its pitch-reversing means to actuate the latter for pitch-reversal of its airscrew to negative pitch upon movement of the throttle lever from normal to abnormal range, or for returning the airscrew to positive pitch upon movement of the throttle lever from abnormal range back to normal range.

JOHN JOSEPH PARKES.
EDOUARD RAOUL DURBEC.

REFERENCES CITED

The following references are of record in the file of this patent:

UNITED STATES PATENTS

| Number | Name | Date |
|---|---|---|
| 1,941,799 | Hall | Jan. 2, 1934 |
| 2,058,161 | Lewis et al. | Oct. 20, 1936 |
| 2,231,343 | Mader | Feb. 11, 1941 |
| 2,280,654 | Mader | Apr. 21, 1942 |